United States Patent [19]

Ware

[11] 4,299,054
[45] Nov. 10, 1981

[54] HYDROPONIC ASSEMBLY AND WAFER FOR USE THEREIN

[76] Inventor: R. Louis Ware, 1739 Chestnut Ave., Glenview, Ill. 60025

[21] Appl. No.: 59,140

[22] Filed: Jul. 20, 1979

[51] Int. Cl.³ ............................................. A01G 31/00
[52] U.S. Cl. ........................................ 47/64; 47/56; 47/74; 47/77; 47/81; 47/84
[58] Field of Search ...................................... 47/59–65, 47/56, 74, 77, 81, 84–87

[56] References Cited

U.S. PATENT DOCUMENTS

| | | | |
|---|---|---|---|
| 2,189,510 | 2/1940 | Swaney | 47/63 |
| 2,785,969 | 3/1957 | Clawson | 47/56 X |
| 2,993,300 | 7/1961 | Sawyer | 47/81 X |
| 3,018,586 | 1/1962 | Farley | 47/63 |
| 3,199,250 | 8/1965 | Sawyer | 47/63 |
| 3,298,133 | 1/1967 | Courtright | 47/81 X |
| 3,300,895 | 1/1967 | Dosedla et al. | 47/81 X |
| 3,375,607 | 4/1968 | Melvold | 47/86 X |
| 3,524,279 | 8/1970 | Adams | 47/87 |
| 3,704,545 | 12/1972 | Van Reisen | 47/84 X |
| 3,938,281 | 2/1976 | Ingerstedt | 47/87 |
| 3,961,444 | 6/1976 | Skaife | 47/84 X |
| 3,971,160 | 7/1976 | Vajtay | 47/84 |
| 4,037,360 | 7/1977 | Farnsworth | 47/63 |
| 4,080,755 | 3/1978 | Crosby | 47/56 |

OTHER PUBLICATIONS

Growing Plants without Soil, Matlin, 1940, Chem. Publ. Co., N. Y., pp. 16–17 cited.

Primary Examiner—Robert E. Bagwill
Attorney, Agent, or Firm—Robert Andrew Brown

[57] ABSTRACT

A hydroponic assembly in the form of a tray having spaced through-openings serving as growing stations, the tray being supported by a trough containing a body of nutrient solution. At each growing station there is a wafer of dry growing medium having a seed-receiving surface on its top side and having a wick communicating with its underside and extending downwardly into the nutrient solution, the growing medium being of the type capable of expanding three-dimensionally into a porous root-supporting block as the solution is fed via the wick by capillary action. The land surface surrounding each opening is formed into a well or receptacle for maintaining the porous block seated and generally aligned with the opening. A transparent cover of hollow inverted shape defines an enclosed space developing high humidity for sprouting of the seeds and growth of the resulting seedlings, the cover, tray and trough being interfitted. The wick is preferably secured to the underside of the wafer by being tacked in place with a metal staple.

17 Claims, 11 Drawing Figures

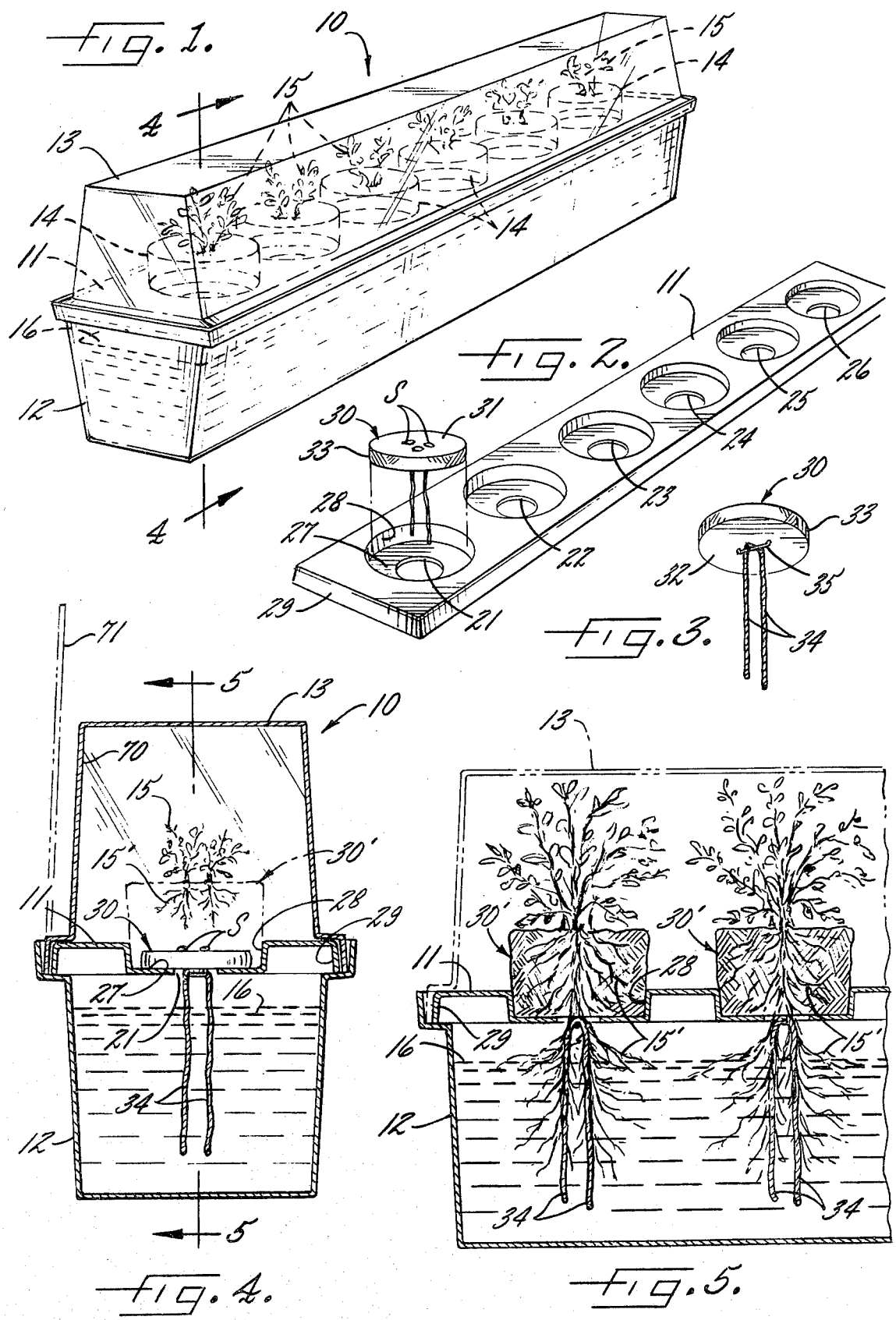

HYDROPONIC ASSEMBLY AND WAFER FOR USE THEREIN

In U.S. Pat. No. 3,300,895 which issued Jan. 31, 1967 there is shown a pad intended for the sprouting of seedlings and made of cotton wool or peat arranged in adjacent layers having vertical interstices between them. The purpose of the interstices is that the roots of the young plant can easily grow through the pad into the nutrient solution arranged below. A porous wick is fixed between two adjacent layers for conducting moisture upwardly into the pad. Connections are made to a pump for pumping nutrient solution into and out of the container on a programmed basis.

It is an object of the present invention to provide an improved hydroponic assembly employing a porous root-supporting block and which constitutes an improvement over that disclosed in the above patent. More specifically it is an object to provide a hydroponic assembly employing a block of homogeneous composition free of vertical layering to encourage outward spreading of the root structure throughout the block. It is a more specific object to provide a porous block which is of substantial height related to its diameter to provide vertically extending lateral area for efficient and constant aeration of the laterally extending root structure within the block.

It is a more specific object to provide a hydroponic assembly which encourages development of two well-defined sets of roots, a first set, primarily in the block itself, which is constantly aerated and a second set which is permanently submerged in the nutrient solution. This provides a constant balance between aerated and non-aerated root structure so that the young plant may achieve optimum health and growth free of any necessity for the alternate flooding and draining which characterizes commercial hydroponic installations and free of the necessity for aeration of the nutrient solution itself and, finally, free of any necessity to employ pumps, piping, valves, reservoirs or the like as taught in the above-mentioned '895 patent.

It is therefore an object of the present invention to provide a hydroponic assembly which is extremely simple, capable of securing growth similar to commercial units in common usage but without requiring care or attention and at a tiny fraction of the cost. Thus it is an object to provide a hydroponic assembly which is ideally suited for use in homes, schools, offices and the like but which has, in addition, commercial capability using either natural or artificial illumination.

It is indeed another object of the invention to provide a hydroponic assembly consisting of a few standardized components but which may be used universally for the propogation of flowers, fruits and vegetables at all stages from the dry seed through sprouting and full growth. In this connection it is an object to provide a hydroponic assembly utilizing a transparent fitted cover for establishing the high humidity required for germination and sprouting of a seed and the growth of the seedling, with the cover being removed for later growth of the full-sized plant. It is a related object to provide an assembly in which the flow of water or nutrient solution may be easily and quickly adjusted to the needs of the plant, providing adequate feed to plants requiring much moisture and more limited feed to plants requiring a relatively dry condition.

It is one of the objects of the invention to provide a hydroponic assembly which is highly productive, with a single unit being capable, in some circumstances, of providing for the certain needs of a household; for example, a single unit is capable of producing all of the leaf lettuce required in a small household on a continuous basis indoors in all seasons of the year.

It is another object to provide a hydroponic assembly which may be operated year round either for production of edible plants, for flowers or for use as a germinating device or starter for plants which are subsequently transplanted to a larger container or outdoors. The assembly as normally used indoors is perfectly clean, being free of mess and dirt, as contrasted with propogation in the usual "flats".

It is yet another and important object of the invention to provide a hydroponic assembly which serves as an ideal botanical teaching aid for personal use or for use in schools or other institutions, all of the way from kindergarten through high school and even at college level. Plants grown in this system require only minimum attention with only occasional refilling of reservoir. Indeed, the hydroponic assembly is quite adequate for use in scientific research activity having to do with the breeding and sprouting of plants of all kinds.

It is still another object to provide a hydroponic assembly which is highly attractive, for example, when used as a window sill decoration, in the kitchen or other room of the house providing a hobby and common interest for all of the members of the family.

It is yet another object of the invention to provide a hydroponic assembly which may be compactly and conveniently packaged as a kit in a transparent wrap which may be supported, if desired, on a peg or display board, not only in flower and garden shops but in hardware and grocery stores, drugstores and the like. It is, in this connection, an object to provide a hydroponic assembly which is inherently economical to construct, being made up of a few simply formed plastic pieces, a small quantity of peat moss and a few seeds but having a level of utility and interest exceeding many times over the cost of production and sale.

Other objects and advantages of the invention will become apparent upon reading the attached detailed description and upon reference to the drawings in which:

FIG. 1 is a perspective view of a hydroponic assembly constructed in accordance with the invention and showing sprouted seedlings.

FIG. 2 is a perspective view of a tray utilized in the assembly with a wafer of growing medium in superimposed position.

FIG. 3 shows the manner in which a wick is connected by a staple to the underside of the wafer of FIG. 2.

FIG. 4 is a transverse section, in elevation, taken along line 4—4 in FIG. 1.

FIG. 5 is a partial section, also in elevation, taken along line 5—5 in FIG. 4.

Figure 6:
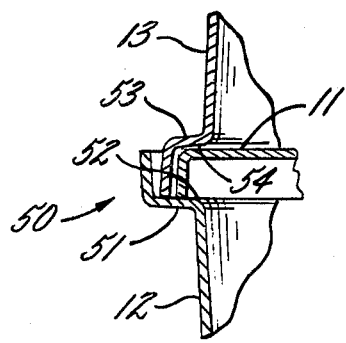
FIG. 6 is an enlarged fragmentary section showing the joint between the parts.

While the invention has been described in connection with certain preferred embodiments, it will be understood that I do not intend to be limited to the particular embodiments shown, but intend, on the contrary, to cover the various alternative and equivalent constructions included within the spirit and scope of the appended claims.

Turning to FIGS. 1 and 2 there is shown a hydroponic assembly 10 formed of a tray 11 supported on a trough 12 and enclosed by a transparent plastic cover 13. The tray serves as a support for porous blocks 14 of the growing medium which may, for example, be peat moss, either formed to be self-supporting or enclosed in a fabric netting. Growing in each block of the medium is a seedling 15. The seedlings are moistened and fed from a body of water or nutrient solution 16 by means to be shortly described.

Turning to FIG. 2 which shows the tray 11 in greater detail, it will be seen that the tray, which may be hot formed or molded of thin plastic, includes a series of growing stations which may, for example, be six in number and which have corresponding through-openings 21–26. Surrounding each of the through-openings is a "land", or ledge, 27 which may, in turn, be bounded by a shallow cylindrical wall 28 to form a recess or receptacle. Surrounding the tray is a vertical flange 29.

Fitted in each of the receptacles is a wafer 30 of dry compressed growing medium which may, for example, be formed of peat moss highly compressed into disc shape, having a top surface 31, an undersurface 32 and a circular edge 33. Typically the wafer 30 may be from one-quarter to one-half inch in thickness and from one to two inches in diameter. In its compressed state the growing medium has the appearance of a disc of dense fiberboard. However, the term wafer will be understood to include a block of dry porous material capable of expansion but initially compressed to a lesser degree.

In accordance with one of the aspects of the present invention, each wafer of growing medium has a wick 34 communicating with its underside, the wick being conveniently in the form of a length of string which is preferably secured to the underside of the wafer by means of a metal staple 35 of the type obtainable in a stationery store and similarly applied. Because of the density of the wafer in its dry state, the staple holds tight and keeps the wick firmly attached even in spite of rough handling.

In carrying out the invention the diameter of the wafer is preferably slightly less than the diameter of the wall 28 of the receptacle so that the wafer is nestingly received and so that, when the wafer is subsequently moistened and expands three-dimensionally into its working state, the block of growth medium, and the plant which it carries, will receive lateral support to prevent toppling.

Seeds S are applied to the top side of the wafer. This may be done either after the wafer is seated in working position or the wafers, if desired, may have the seeds adherently pre-applied and held in place by a water soluble mucilage such as gum arabic.

In use, the wafers are inserted at the respective growing stations with the wicks 34 thereof dangling down into the body of solution 16. Moisture travels up the wick by capillary action into the lower portion of the wafer from which the moisture passes throughout the wafer, expanding it into a porous, relatively soft root-supporting block as indicated at 30'. It is found that by tacking the string wick into place with a staple 35, the flow into the wafer, and into the resulting block, is unaffected by the tightness of the staple. That is, rather than the staple pinching off the flow, flow occurs to about the same degree even where the staple is extremely tight. The reason is that the moisture loosens and expands the growing medium in the immediate vicinity of the staple thus promptly relieving the wick of any tightness which may initially exist. If desired the wick may be looped through two adjacent but spaced staples.

It is found that where a transparent plastic cover 13 is employed germination of the seeds occurs promptly even though the seeds are only resting in light contact with the top of the porous block. The reason is that moisture continues to be supplied via the wicking not only saturating the porous block but, by evaporation from the block, saturating all of the air in the space surrounding the block so that the seeds are exposed to substantially 100 percent humidity. Rather than simply allowing the seeds to rest upon the porous block in exposed position, the wafer may be formed with a central depression, or well (not shown), in which the seeds are initially planted. In either event, each seed sends down rootlets 15' which extend not only throughout the block but which also, as the plant grows, follow the wicking down into the body of the solution as shown in FIG. 5. This provides a direct path for moisture flow insuring conduction of an adequate amount of moisture to the plant as the plant progresses beyond the seedling stage.

It is one of the advantages of the present arrangement that a degree of aeration necessary for the root structure is automatically achieved. While the lower portion of the roots 15' are constantly and completely wetted, there is a high enough proportion of the root structure which is above water level, and with which air is in direct contact, to insure against the plant becoming "water-logged". Contributing to the area exposed to air is the fact that each porous block of growing medium is of substantial height providing vertically extending lateral area for efficient aeration of root structure contained therein. By substantial height is meant that the height is at least a major fraction of the horizontal dimension of the block. This makes it unnecessary to provide means for forcing air into solution or for alternate flooding and drainage as required in commercial hydroponic systems.

Figure 7:
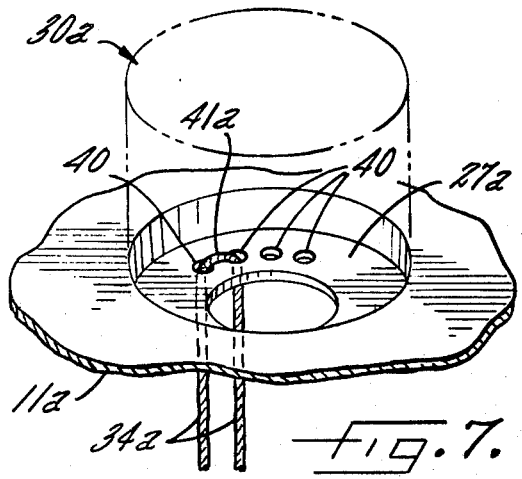
FIG. 7 is a fragment showing a receptacle with alternate means for bringing moisture into contact with the wafer.
Figure 8:
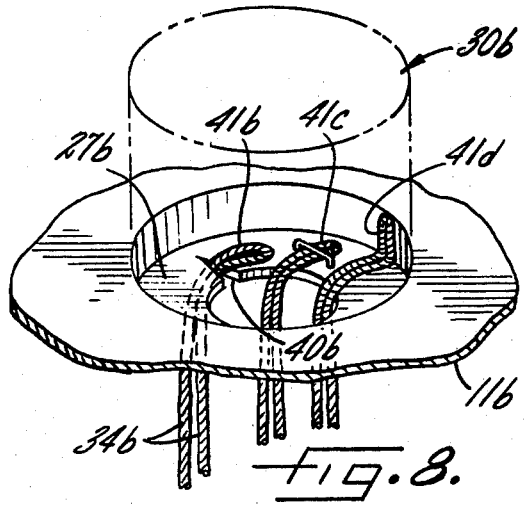
FIG. 8 is a view similar to FIG. 7 and showing a still further alternatives.

While it is preferred to tack the wick in place on the underside of the wafer by a staple or the like thereby producing an easily handled and easily used article of manufacture, the invention is not limited thereto and includes other means for providing contact between the wick and the wafer as shown in FIGS. 7 and 8, where corresponding elements are indicated by corresponding reference numerals with suffixes "a" to "d", respectively.

Taking up first the structure shown in FIG. 7, the wick 34a, instead of being permanently attached to the wafer, is threaded through holes 40 formed in the land surface, or ledge, 27a. The wick may, for example, pass upwardly through the first hole and downwardly through the second, providing a horizontally draped loop 41a which is in capillary communication with the underside of the wafer by reason of the weight of the wafer and the resulting porous block 30a. The length of wicking draped over the block may be increased or decreased by proper choice of holes. In FIG. 8, instead of the series of holes, a V-shaped notch 40b is provided into which the wick 34b is tucked thereby forming a draped upper loop 41b, the length of which is a matter of choice. The loop may be attached in position by a staple or the like as shown at 41c or simply wedged against the side of the wafer as at 41d. The constructions shown at 41a, 41b enable the rate of moisture flow to be varied at any time during the growth cycle simply by lifting the porous block out of its received position and adjusting the length of the loop which is in contact therewith. The number of strands of wicking may also be changed to vary the flow rate.

Figure 6A:
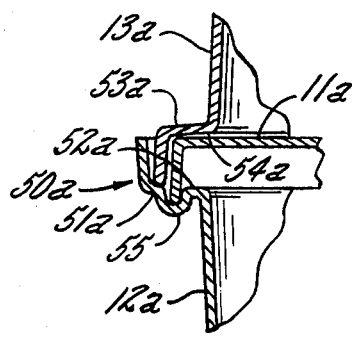
FIG. 6a shows an alternate form of joint.

In accordance with one of the aspects of the present invention an interfitting joint is provided at the junction of the tray, the trough and the cover to provide good mechanical support and to prevent undue leakage of moisture during the germination phase. Thus the trough is provided with a step or offset along its upper edge which forms an inner supporting ledge, the flange of the tray is downturned for seating on the ledge, and the transparent hollow cover has its lower edge dimensioned for seating about the edge of the tray. A typical joint, indicated in enlarged form at 50 in FIG. 6, includes a step 51 on the trough 12 defining an internal ledge 52 as well as a step 53 on the cover 13 defining an internal ledge 54 which embraces the tray 11. The edge of the cover 13 may either seat upon the ledge 52 in the trough or fall slightly short of it. In an alternate joint construction shown in FIG. 6a, where similar reference numerals have been employed with letter subscripts, the ledge 52a on the trough is formed into a groove 55 for matingly receiving the edge flange of the tray to support the side walls of the tray against bulging by the contained liquid. In any event a reliable joint is secured, and any moisture which may condense on the inside surface of the cover drains down into the trough so that there is no risk of damaging the supporting woodwork.

Figure 9:
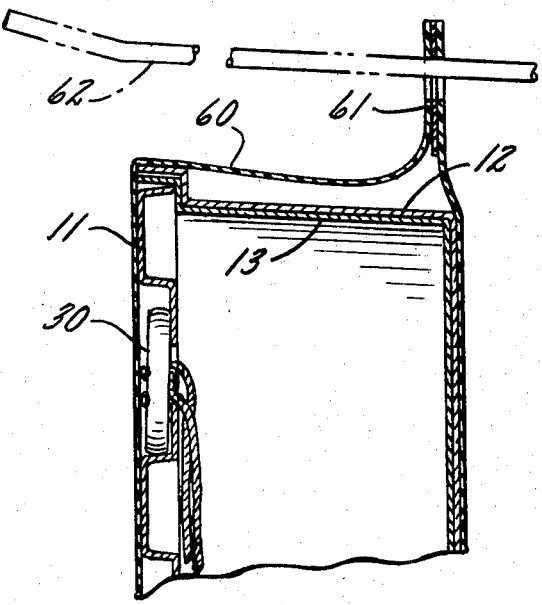
FIG. 9 is a cross sectional, fragmentary view showing how the entire assembly may be merchandised in a compact state.

Preferably the trough 12 and cover 13 are of conforming shape but with the cover being of slightly smaller size than the trough for containment therein in "reversed" position for display, packaging and shipment. Such assembly for display purposes is illustrated in FIG. 9 where the cover 13 is shown nested within the trough 12 so that the tray 11 and wafers 30 are on display, contained within a transparent wrapping 60 which terminates at its upper end in a hanger portion 61 which may be slipped over a pin 62 of a dispensing and display board.

Figure 10:
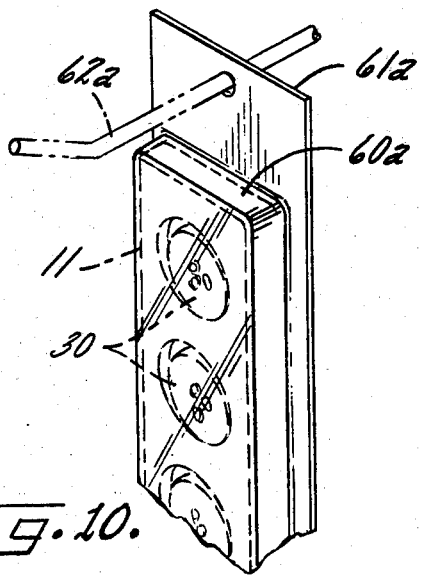
FIG. 10 shows the manner in which a loaded tray may be merchandised by itself in a transparent package.

Alternatively, trays 11 alone may be packaged in a transparent wrap 60a with hanger 61a for display and dispensing on a pin 62a as shown in FIG. 10, either for initial usage or as refills. A still further mode of merchandising involves the sale of the wafers 30 with wick attached and either with or without seeds in place. To insure germination two or three seeds may be used. In most cases only a single plant per growing station will be desired, in which case plants in excess may be removed in a thinning operation as or after sprouting occurs.

Where the hydroponic assembly is sold as a kit, the kit should preferably include a supply of nutrient to be mixed with the water to form the nutrient solution. The nutrient may be provided in powdered, tablet or liquid form, as may be convenient. Alternatively, each wafer may be impregnated with nutrient so that all that is required is the addition of water to the trough, the nutrient in such circumstances being present in low concentration, or of the timed release variety, so as not to poison the seedlings. If desired, the wick may be impregnated by soaking in a solution of timed release nutrient.

While the invention has been described in connection with a preferred embodiment employing a tray of rectangular shape having a series of growing stations, mounted upon a trough of conforming shape, it will be apparent that the invention is not limited thereto and other shapes may be used, for example, the tray, trough and cover may be circular or oval. If desired, in a larger growing operation, a plurality of rectangular trays 11 may be used side by side, over, and supported by, a single large trough. When used in multiple the trays may either be covered by individual transparent covers 13 or by a single large cover, for example, one which conforms to the plan profile of the associated troughs.

While peat moss, or sphagnum moss, are preferred as the growing medium, it will be understood that the invention is not limited thereto and, if desired, a wafer may be formed of a dry compressed disc of fibrous or bonded granular material capable of expanding and forming an enlarged porous block upon addition of moisture, the block being homogeneous to the extent that it is free of vertical stratification or layering. Or the block may be made of polymeric material in the form of a homogeneous open-celled foam.

The term "wafer" as used herein is not necessarily limited to a growing medium in the shape of a disc or cylinder and, if desired, the wafer may be of square or other shape fitted in a correspondingly shaped receptacle in the tray. The term "tacked" as applied to the securing means for the wick includes use of any pointed, permanent fastener, a staple being preferred. The term "nutrient solution" is a generic term which includes water.

Also while the described ledges 27, 52 and 54 of the preferred embodiment are of a smoothly continuous nature, the term "ledge" will be understood to include both continuous and discontinuous means of support. Consequently, the term "receptacle" as used herein is intended to include an area bounded by a wall which is either continuous (as shown) or sectional capable of holding the wafer in a generally centered position at the respective growing stations, either with or without lateral gripping of the block. The term "edge flange" used in connection with the tray refers to the vertical flange used in the illustrated embodiment but it will be understood that the tray may be bounded by a horizontal flange if desired and where the reinforcing effect of the vertical flange is not required. By "thin", as applied to the tray, is meant its vertical dimension relative to the vertical dimension of the trough and cover.

Finally, while it is one of the features of the present invention that the growing medium is compactly supplied in the compressed state, it will be understood that the invention, in certain of its aspects, may be practiced without severe initial compression, in which case the dry "wafer" becomes a "porous block" with limited expansion as a result of the moisturing step.

After the seedlings have progressed to the point of being sturdy plants no longer requiring an artificially saturated atmosphere, the transparent cover 13 may be removed so that the plants may grow to full size. It is a feature of the present invention, in one of its aspects, that the interfitting which occurs between the porous block and its receptacle, as the block expands, provides adequate lateral bracing so that there is no danger of even a large plant toppling from its support. Alternatively, the seedlings, once grown to transplanting size, may be potted or bedded and the assembly may be used for sprouting of another full set of seeds within a cycle of a few days.

The cover 13, being made of thin, but self-supporting, transparent plastic passes a high proportion of the incident light from natural or artificial sources. It is, nevertheless, one of the features of the present invention that where the assembly receives light predominantly from one side, as when stationed on a windowsill, a thin reflective coating 70 may be applied on the "dark" side (see FIG. 4) so that the back side of the seedlings is illuminated by reflected light. This overcomes any tendency toward phototropism. Preferably the reflecting surface 70 is in the form of "half silvering" so that the seedlings continue to be fully viewable even with the cover in place. Subsequently as the plants grow, and the cover is removed, the same effect may be achieved by use of a mirror element 71 in the form of a half silvered strip of transparent plastic conforming in dimension to the plants and which is inserted as shown (FIG. 4) within the lip of the trough in a self-supporting position.

The porous blocks of growing medium, being relatively homogeneous and free of the vertical layering which characterizes the prior art, encourages the growth of a first, aerated root structure profusely within the block enabling the second root structure, which grows down into the nutrient, to remain constantly submerged without ill effect. Thus seedlings may sprout and grow completely unattended without any necessity for varying the water level on a programmed basis. Subsequently, when the seedlings have grown to planthood removal of the cover is all that is necessary to continue healthy growth to maturity, each plant regardless of size being stably supported in its own receptacle. But where transplanting is desired the porous block containing the plant may simply be lifted out of the tray with its lower root structure, which extends along the wick, intact and free of entanglement.

While the cover has been shown free of ventilating apertures, which is desirable to achieve the maximum humidity required in germination and sprouting, less humidity is required once a seedling has been formed. For this purpose die-formed "punch-out" openings (not shown) may be provided in one or more of the five cover surfaces, or, as an alternative, permanent openings may be formed in the material which are temporarily covered, during germination and sprouting, by an adhesive patch.

The assembly makes it possible for the first time to have plants throughout a household simply for purposes of enjoyment without having to pay the penalty of constant watering or incur the risks of messy dirt. Absences due to vacation or the like are safely bridged. The assembly is not only economical but of universal utility, ranging all the way from a gift to a young child to horticultural studies of the most sophisticated type.

What is claimed is:

1. A hydroponic assembly comprising a tray of planar material having a plurality of growing stations spaced one from another to permit circulation of air thereabout, the respective growing stations each having through-openings surrounded by a land surface and a vertical surface rising therefrom to at least the height of the tray surface, a trough for supporting the tray and for containing a body of nutrient solution disposed beneath the growing stations, a wafer of dry compressed growing medium supported on the land surface at each growing station, a seed-receiving surface disposed on a top side of said wafer, a wick communicating with the wafer and extending downwardly into the nutrient solution, the wafer upon receiving nutrient solution through the wick by capillary action being capable of expanding three-dimensionally into a porous block having a height substantially greater than said vertical surface of said growing station and having a homogeneous composition that permits outward spreading of root structure, the height of the block being effective to provide vertically extending lateral area so that the contained root structure will receive constant aeration.

2. The hydroponic assembly of claim 1 wherein each wafer is moistened and in an expanded condition and is thereby secured in the corresponding through-opening.

3. The hydroponic assembly of claim 1, or 2 wherein each growing station is a circular recess.

4. The hydroponic assembly of claims 1 or 2 wherein the wick comprises a length of string secured to the underside of said wafer at a generally central position thereof.

5. The hydroponic assembly of claim 4 wherein the wick is secured to the underside of the wafer by means of a tack.

6. The hydroponic assembly of claim 4 wherein the wick is secured to the underside of the wafer by means of a staple.

7. The hydroponic assembly of claims 1 or 2 wherein the trough comprises an upper edge dimensioned to receive and support the tray, and a transparent cover of hollow inverted shape having a lower edge dimensioned for seating about the edge of the tray for defining an enclosed space having high humidity for germination of seeds and nurture of resulting seedlings.

8. The hydroponic assembly as claimed in claim 7 wherein the trough and the cover are of conforming shape but with the one being scaled to slightly smaller size than the other, for nested containment of one within the other for display packaging and shipment.

9. The hydroponic assembly as claimed in claim 1 wherein the wick is in the form of a string the upper portion of which is draped over the land surface so as to be in capillary communication with the underside of the wafer.

10. The hydroponic assembly as claimed in claim 1 wherein each wick is attached to its respective land surface, the weight of the wafer and resulting porous block being sufficient to establish capillary communication with the wick.

11. The hydroponic assembly of claim 1 wherein said growing stations are circular, said wafer being dimensioned to have an initial nested fit in each growing station, said wick being in the form of a length of string secured to an underside of the wafer, and said wafer upon being moistened expanding three dimensionally into said block so that an increased lateral dimension results in a snug bracing fit with the vertical surface of the growing station.

12. The hydroponic assembly as claimed in claim 11 wherein the wick is in snug wedged engagement between the porous block and the vertical surface of the growing station.

13. The hydroponic assembly as claimed in claim 1, wherein the trough has an upper edge formed to provide a step defining an inner supporting ledge and an upwardly extending lip surrounding the same, the tray being adapted to seat on the ledge, and a transparent cover of hollow inverted shape having a lower edge dimensioned for seating about the edge of the tray but within the lip of the trough so as to define an enclosed space having high humidity for sprouting of seeds and nurture of resulting seedlings.

14. The hydroponic assembly as claimed in claim 13 wherein the trough has parallel side walls and in which the supporting ledge on the trough is formed into a groove for matingly receiving the edge of the tray so that the tray supports the side walls against outward bowing due to the pressure of the nutrient solution thereagainst.

15. The hydroponic assembly as claimed in claim 13 wherein the cover has a pair of elongated side walls facing one another and in which one of the side walls, specifically the back side wall opposite the entry of the predominant light, is half-silvered to achieve reflection of light to the backside of the plants while permitting viewing thereof.

16. The hydroponic assembly as claimed in claim 13 including a planar transparent reflecting element with a half-silvered surface having its lower edge dimensioned to fit within the lip of the trough for support therein in a generally vertical position.

17. The hydroponic assembly as claimed in claim 1 wherein the wick is impregnated with dry soluble nutrient material.

* * * * *